(12) United States Patent
Monsen, III et al.

(10) Patent No.: US 6,282,410 B1
(45) Date of Patent: Aug. 28, 2001

(54) MODULE PACK FOR COORDINATION OF WORK WITHIN HAZARDOUS ENVIRONMENTS

(75) Inventors: Andres Monsen, III, Santa Fe Springs; John Joyce, Vista, both of CA (US)

(73) Assignee: Southern California Edison, Rosemead, CA (US)

( * ) Notice: Subject to any disclaimer, the term of this patent is extended or adjusted under 35 U.S.C. 154(b) by 0 days.

(21) Appl. No.: 09/240,917

(22) Filed: Jan. 29, 1999

(51) Int. Cl.[7] .................................................. G08D 1/08
(52) U.S. Cl. ............................... 455/90; 455/78; 340/539
(58) Field of Search .................................. 455/74, 860, 89, 455/90, 575, 78, 566, 66, 344; 340/539, 691.1, 693.1, 693.5, 693.6, 521, 825.36, 825.49; 250/388, 484.5, 364, 380, 370, 435, 438

(56) References Cited

U.S. PATENT DOCUMENTS

| | | | |
|---|---|---|---|
| H1660 | * 7/1997 | Herman et al. | 180/6.2 |
| 4,301,367 | * 11/1981 | Hsu | 250/370 |
| 4,342,913 | * 8/1982 | Sheperd | 250/364 |
| 4,642,463 | * 2/1987 | Thoms | 250/336.1 |
| 5,440,232 | * 8/1995 | Scarzello et al. | 324/247 |
| 5,500,532 | * 3/1996 | Kozicki | 250/372 |
| 5,745,268 | * 4/1998 | Eastvold et al. | 359/110 |
| 5,891,682 | * 4/1999 | Yoshida et al. | 435/91.2 |
| 5,905,262 | * 5/1999 | Spanswick | 250/368 |
| 6,031,454 | * 2/2000 | Lovejoy et al. | 340/539 |

OTHER PUBLICATIONS

Article entitled "Improved Radiological Controls" by Dick Warnock, in *Radiation Protection Management*, May/Jun. 1997.

Article entitled "San Onofre Gets Wired for Refueling" by Sherry C. Folsom, in *Nuclear News*, Jun. 1997.

* cited by examiner

*Primary Examiner*—Thanh Cong Le
*Assistant Examiner*—Pablo Tran
(74) *Attorney, Agent, or Firm*—Sheldon & Mak; Denton L. Anderson

(57) ABSTRACT

A module pack for relaying communications and data information includes: (a) a portable housing, (b) an audio signal receiver disposed within the housing, the audio signal receiver being capable of receiving electromagnetic audio signals, (c) a video signal receiver disposed within the housing, the video signal receiver being capable of receiving electromagnetic video signals, (d) a radiation dosimeter receiver disposed within the housing, and radiation dosimeter receiver being capable of receiving radiation dosimeter data, and (e) a communications data transmitter for transmitting the audio signals, the video signals and the dosimeter data to a location separate from the housing via a single communications data transmission cable. The invention provides a fully integrated module which allows for critical communications and radiation dosimetry data to be exchanged between several workers working simultaneously within the work area and with health physics technicians and supervisors working away from the work area. The combination of the invention allows for the rapid and efficient set-up, operation and disassembly of various modular communications and radiation dosimetry data receiver/transmitters. Use of the invention has been found to greatly reduce the costs of conducting work within radiation hazardous environments, while greatly improving the ability of the workers to conduct the work in a safe and efficient manner.

20 Claims, 3 Drawing Sheets

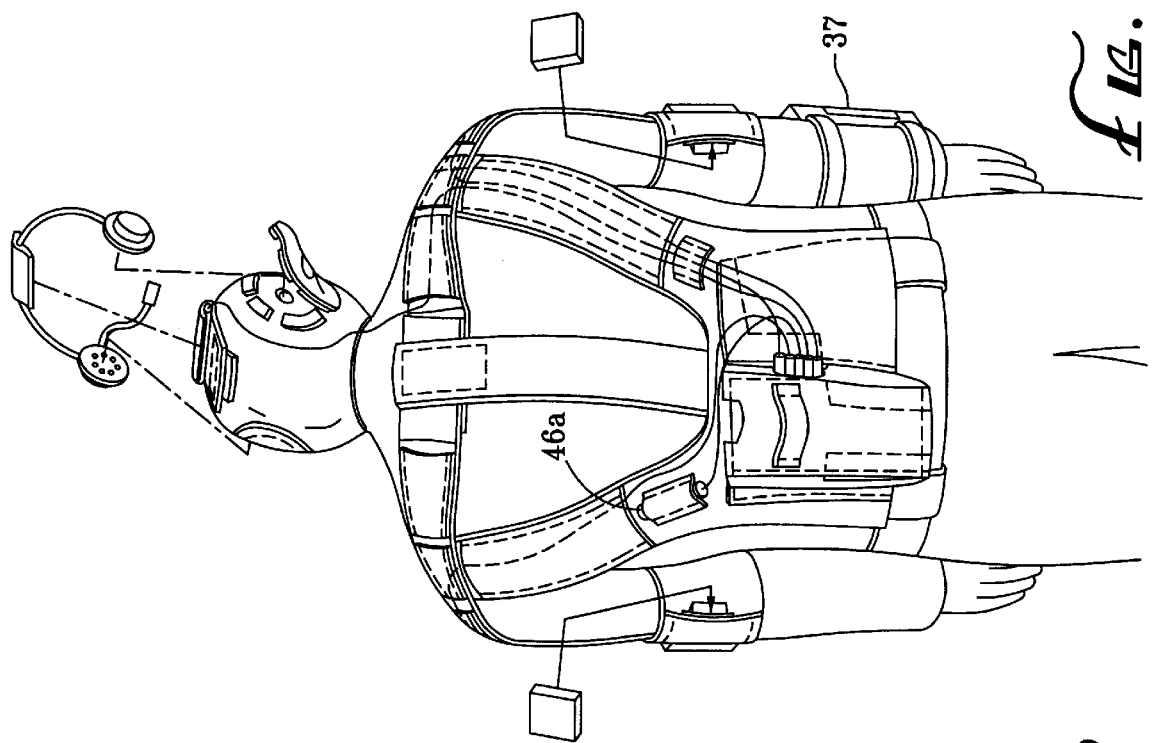
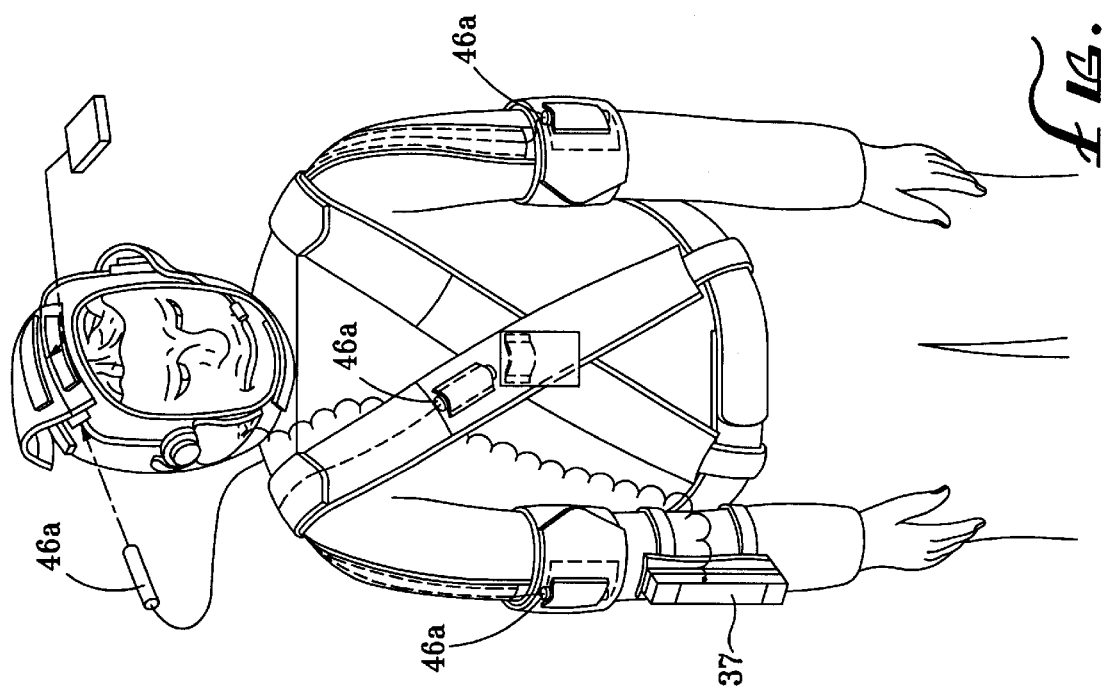

MODULE PACK FOR COORDINATION OF WORK WITHIN HAZARDOUS ENVIRONMENTS

FIELDS OF THE INVENTION

This invention relates generally to communications and data relay equipment and, more specifically, to communications and data relay equipment useful for work in hazardous environments.

BACKGROUND OF THE INVENTION

Since the earliest days of the Industrial Revolution, industry has struggled to safely conduct plant maintenance and other necessary work within hazardous environments. Prior to the second half of this century, most such hazardous environments involved hazardous chemical agents. Since 1950, such hazardous environments may also involve radioactive agents. Industry is continuously working towards improving equipment and techniques which will make working within such hazardous environments safer.

The nuclear power industry has been especially active in this regard. The problem faced by the nuclear power industry is how to safely conduct maintenance and other necessary work within the large contaminant structures wherein potential sources of radioactivity are typically housed. Work within such contaminant structures requires extensive efforts to minimize dangers to workers from radioactive exposure. In the 1990's, such efforts include the employment of a wide variety of sophisticated equipment to monitor radiation levels within the work area and to monitor the personal radiation exposure of each worker within the work area. Video cameras and radio communication equipment are also increasingly used to allow supervisory personnel outside the area or confining structure to more efficiently monitor and supervise work within the work area.

The use of such sophisticated equipment, however, has led to a number of problems. First of all, the use of the wide variety of sophisticated equipment frequently results in the work area being cluttered with an inordinate number of individual pieces of equipment. This not only presents a physical space problem, but also makes the work area prone to tripping accidents.

A second problem arises from the fact that each individual piece of equipment generally requires its own electrical power and generally requires its own data input and data output cables. This leads to a proliferation of electrical wires and cables strung throughout the work area. All of these electrical wires represent safety obstructions within the work area and make set-up of the various pieces of equipment inordinately complicated, time-consuming, expensive and exposure intensive.

A third problem regarding the use of such sophisticated equipment arises from the fact that typical confining structures have a limited number of electrical outlets. The increasing use of individual sophisticated devices has created a competition for those electrical outlets, not only among the various pieces of equipment, but also between the various pieces of equipment and the electrical tools used by the workers performing the work. It is not unusual, for example, for a worker needing electrical power for his tool to unplug one of the sophisticated monitoring devices within the work area so as to have access to the electrical outlet for his tool.

A fourth problem regarding the use of the wide variety of sophisticated equipment arises from the difficulty in transmitting all of the data from each individual piece of equipment to monitoring stations located outside of the confining structure. Typically, such confining structures have only a very limited number of "penetration ports" through which electrical wires and cables can be run between the inside and the outside of the confining structure. As the number of sophisticated pieces of equipment within the work area has proliferated, the difficulty in transmitting all of the data from all of these pieces of equipment to outside the confining area has increased.

Accordingly, there is a need for improved techniques and equipment for maintaining the safety of workers within a confined hazardous area which avoid the above-described problems in the prior art—in an efficient and inexpensive manner.

SUMMARY

The invention satisfies this need. The invention is a combination comprising: (a) a portable housing, (b) an audio signal receiver disposed within the housing, the audio signal receiver being capable of receiving electro-magnetic audio signals, (c) a video signal receiver disposed within the housing, the video signal receiver being capable of receiving video signals, (d) a radiation dosimeter data receiver disposed within the housing, the hazardous material indication data being capable of receiving hazardous material indication data, and (e) a communications data transmitter for transmitting the audio signals, the video signals and the hazardous material indication data to a location separate from the housing via a single communications data transmission cable.

The invention provides a fully integrated module which allows for critical communications and radiation dosimetry data to be exchanged between several workers working simultaneously within the work area and with health physics technicians and supervisors working away from the work area. The invention allows for the rapid and efficient set-up, operation and disassembly of various modular communications and hazardous material indication data receiver/transmitters. Use of the invention has been found to greatly reduce the costs of conducting work within hazardous environments, while greatly improving the ability of the workers to conduct the work in a safe and efficient manner.

The invention is ideally suited for use in a unique system for protecting workers within radioactive environments as set forth in U.S. patent application Ser. No. 09/239,567, entitled "Protective System for Work in Radioactive Environments," filed concurrently herewith. The invention is also ideally suited for use with a unique head gear combination as set forth in U.S. patent application Ser. No. 09/239,228, entitled "Head Gear for Work in Radioactive Environments," filed concurrently herewith. The invention is still further ideally suited for use with a unique vest combination as set forth in U.S. patent application Ser. No. 09/239,557, entitled "Best for Work in Radioactive Environments," also filed concurrently herewith. The entirety of each of these three patent applications is incorporated herein by this reference.

DRAWINGS

These features, aspects and advantages of the present invention will become better understood with regard to the following description, appended claims and accompanying figures where:

FIG. 3 is a perspective front view of a radiation area workman carrying dosimeter equipment useful with the invention; and FIG. 4 is a perspective rear view of a radiation area workman carrying dosimeter equipment useful with the invention.

DETAILED DESCRIPTION

Figure 1:
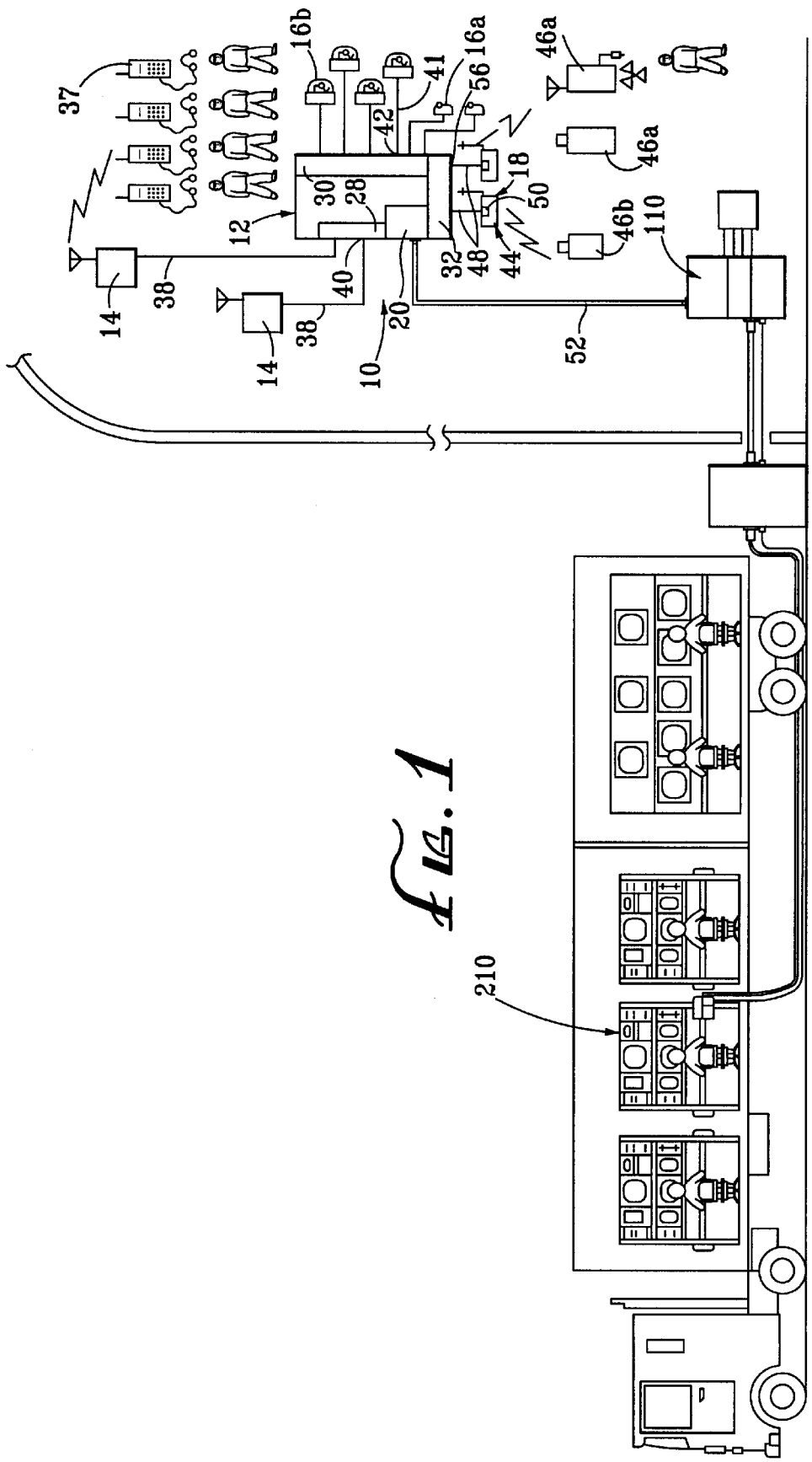
FIG. 1 is a perspective view of a combination having features of the invention.

The following discussion describes in detail one embodiment of the invention and several variations of that embodiment. This discussion should not be construed, however, as limiting the invention to those particular embodiments. Practitioners skilled in the art will recognize numerous other embodiments as well.

The invention is an input module combination 10 comprising a portable housing 12, an audio signal receiver 14, a video signal receiver 16, a hazardous material indication data receiver 18 and a communications data transmitter 20.

The portable housing 12 is a structure which provides a base location for the audio signal receiver 14, the video signal receiver 16, the hazardous material indication data receiver 18 and the communications data transmitter 20. The portable housing 12 can also be constructed to provide storage compartments for the various pieces of ancillary equipment when the input module 10 is not in use.

The housing 12 should be as compact as possible for convenient storage and maximum portability. For convenience in storage, the portable housing 12 can be parallelepiped in shape and enclose a volume less than about 12 cubic feet. In one embodiment, the portable housing 12 is parallelepiped in shape, and has the dimensions of 30"×30"× 19".

Figure 2:
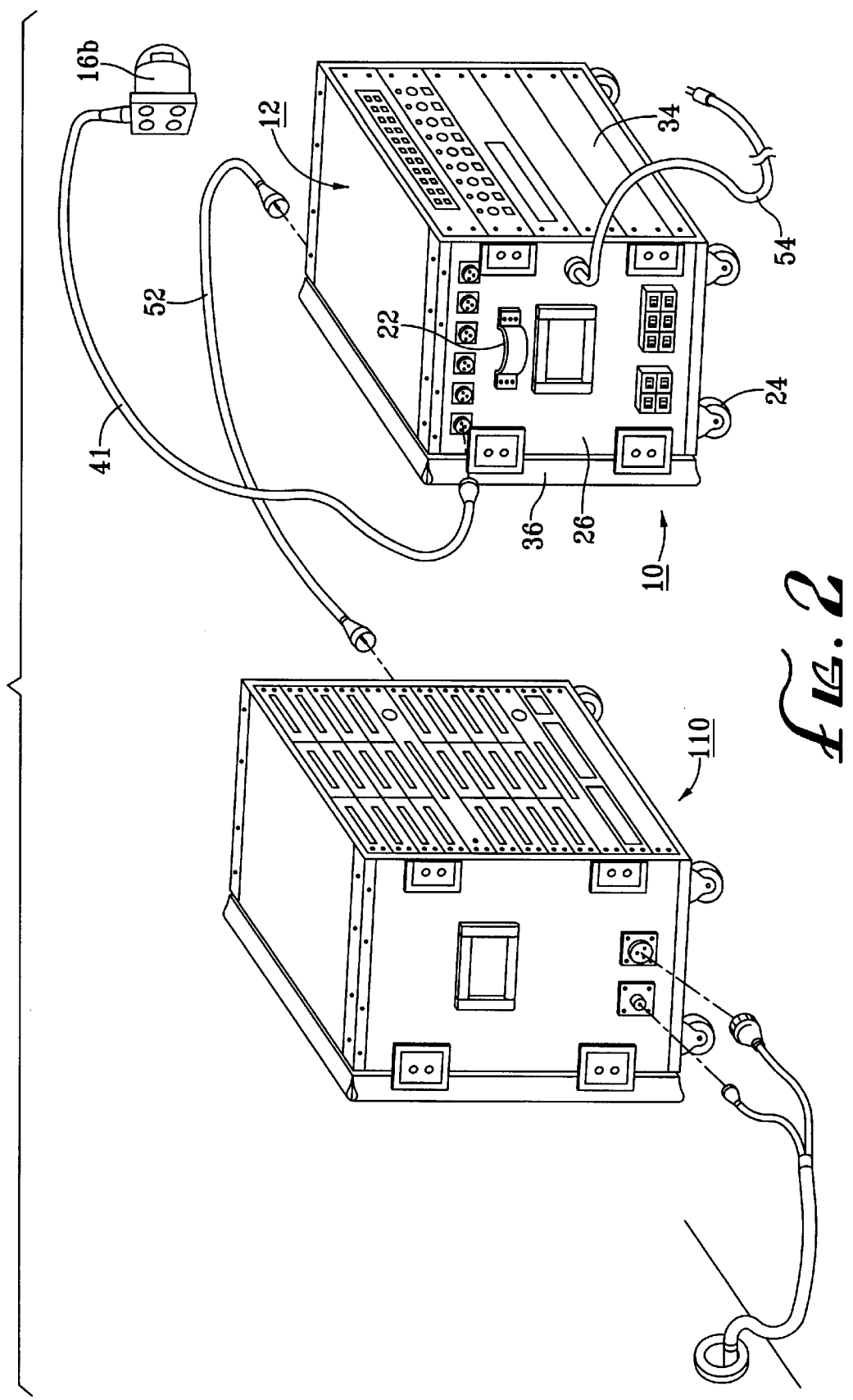
FIG. 2 is a diagrammatic view of a combination having features of the invention.

The portable housing 12 can further comprise a handle 22 and/or a plurality of wheels 24 to allow the housing 12 to be easily translated across a horizontal surface. In the embodiment illustrated in FIG. 2, the portable housing 12 has four wheels 24, each disposed at one of the four lower-most corners of the portable housing 12.

Typically, each of the various cable connection ports required in the input module (described below) are disposed on opposite ends 26 of the portable housing 12 for easy access. The internal parts of the input module 10 (such as the auto signal collections and retransmission device 28, the VTT transmitter 30 and the terminal server 32, described below) can be housed within the interior of the housing 12. Such internal parts are preferably made easily accessible for set-up, operation and maintenance via the opposed side walls 34 of the housing 12. Typically, the opposed side walls 34 are covered during storage by removable side doors 36.

The audio signal receiver 14 can be a radio signal receiver. Preferably, however, the audio signal receiver 14 comprises one or more microcell base stations 14 for receiving cellular phone signals from a plurality of cellular phones 37. Each microcell base station 14 is hardwired into the portable housing 12 by audio signal receiver cables 38 connected to audio signal receiver cable connection ports 40 disposed in the portable housing 12. Preferably, the audio signal receiver cable connection ports 40 are sized and dimensioned to attach only to audio signal connection cables 38.

It is also preferable that each microcell base station 14 be capable of handling a plurality of cellular phone users at one time. Each microcell base station 14 is of the "campus-wide" type, operating on low output power so as to not interfere with communications systems operating outside the containment structure. Typically, the microcell base stations 14 operate at less than about 1 watt, preferably at about 0.001 watts, and have an effective distance range of 150–1000 feet. Typical microcell base stations 14 useable in the invention are Model DCT900's manufactured by Ericsson Company of Sweden. Each such Model DCT900 base station operates at 0.001 watts and 900 megahertz, and is capable of supporting up to 8 digital PCS cellular phones at a distance of up to about 300 feet.

Preferably, the input module 10 further comprises a cable tester (not shown) disposed within the portable housing 12. The cable tester allows for set-up personnel to quickly and efficiently check for continuity of the audio signal input cables 38 and the polarity of the audio signal receiving system as a whole. Most preferably, the cable tester is designed and installed so that it can be plugged into each microcell base station 14 at the juncture where the audio signal input cable 38 is attached, so as to confirm the proper installation of the microcell base station 14 and to confirm the availability of the proper voltage.

The video signal receivers 16 typically are standard video cameras 16 which are hardwired to the portable housing 12 by video signal receiver cables 41 which connect to video signal receiver cable connection ports 42 disposed within the portable housing 12. Preferably, the video signal receiver cable connection ports 42 are sized and dimensioned to attach only to video signal receiver cables 41.

Preferably, the video signal receivers 16 comprise fixed video cameras 16a and video cameras of the pan/tilt/zoom variety 16b. The fixed cameras 16a can be any suitable fixed video camera. Panasonic Model F2 having a fixed focus and ¼" ("charge coupled device") have been found useable in the invention. Typical pan/tilt/zoom cameras 16b useable in the invention are Model EC8 cameras manufactured by Elbex America, Inc. of Westminster, California. These cameras are dome-type cameras having 12x zoom, high resolution and ½" ccd.

In a typical embodiment, the input module 10 can receive input from up to six different video signal receivers 16.

The hazardous material indication data receiver 18 can be any receiver designed and adapted to receive a specific indication of the presence of a hazardous material. In hazardous chemical environments, for instance, the hazardous material indication data receivers 18 are designed and adapted to indicate the presence of one or more specific hazardous chemicals. When the invention is used to monitor a radiation hazardous area, the hazardous material indication data receivers 18 are radiation dosimeter data receivers 18 as indicated in the embodiment illustrated in the drawings.

The radiation dosimeter data receivers 18 preferably comprise one or more electromagnetic wave receiving modems 44 which receive data transmitted by a plurality of electromagnetic wave transmitting devices ("teledosimeters") 46. Each such electromagnetic wave receiving modem 44 provides a "dosimeter base station" for support of multiple teledosimeters 46. The teledosimeters 46 can include personal teledosimeters 46a attached to workers within a radiation hazardous area, fixed teledosimeters 46b useable in measuring radiation within a particular localized area ("area monitors") and air monitoring teledosimeters 46c capable of measuring the radioactivity of particles suspended within the atmosphere within a localized area. Preferably, each such teledosimeter 46 transmits radiation dosimetry data via radiowaves (or other electromagnetic waves) to the modems 44. Transmitting the dosimetry communications data via electromagnetic waves minimizes the number of electrical wires which must be strung out into the work area from the input module 10. Preferably, each modem 44 has multiple channels.

Typically, the modems 44 are of a number of any suitable radio wave receiving modems known in the industry. One such modem useable in the invention is a Prolinx model modem manufactured by Proxim of Mountainview, California, capable of seven frequency channels.

In a typical embodiment, the input module 10 comprises sufficient modems 44 to support 16 workers.

Each modem 44 is typically hardwired into the input module 10 by radiation dosimeter data input cables 48 connected to radiation dosimeter data input connection ports 50 which preferably accept only radiation dosimeter data input cables 48.

Preferably, the modems 44 are of a "heavy duty" variety capable of transmitting dosimetry communications data via an RJ45 connector, rather than the standard DB9 connector, and powered by 12 volt AC electrical supply, rather than by the more standard 9 volt DC electrical supply. In the invention, standard modems having a DB9 connector and a 9 volt DC power input can be upgraded to "heavy duty" variety by use of an adaptor module 50 which allows connection to the modem via an RJ45 connector and which allows the modem 44 to be powered by 12 volt AC electrical power (which is rectified and transformed in the adaptor module 50 to 9 volt DC electrical power).

Personal dosimetry data can be received from each of a plurality of personal teledosimeters 46a attached to the clothing of a worker working within the hazardous area, such as is illustrated in FIGS. 3–4. Typical personal teledosimeters 46a useable in the invention are manufactured by SIAC of San Diego, Calif.

Typical air monitors 46c useable in the invention are manufactured by Eberline of Sante Fe, N.Mex., and are sold as Models AMS4.

In a typical embodiment, the input module 10 can receive input from up to four dosimeter radiation data receiving modems 44.

Each of the audio signal receiver cables 38, video signal receiver cables 40 and radiation dosimetry data cables 48 are preferably category 5 or similar so that electric power for each of the audio, video and radiation dosimetry signal receivers 14, 16 and 18 are provided from the input module 10 via these cables 38, 40 or 48.

The communications data transmitter 20 is most conveniently typically disposed within the portable housing 12. The communications data transmitter 20 typically comprises the terminal server 32 which allows all of the dosimetry communications data received from the plurality of modems 44 to be multiplexed and transmitted to a location separate from the portable housing 12 via a single communications data transmission cable 52. In the embodiment illustrated in the drawings, such "location separated from the portable housing" is one or more relay modules 110. The relay modules 110 are typically used to transmit data from the input module 10 to one or more control centers 210.

The housing 12 further comprises the audio data collections and retransmission device 28 such as a microcell manufactured by Ericsson of Sweden.

The communications data transmitter 20 also typically comprises a plurality of VTT transmitters 30 capable of accepting video communications data from each of the cameras 16 and transmitting that data to the location separate from the housing by the single communications data transmission cable 52.

The single communications data transmission cable 52 can be any suitable cable capable of transmitting data from each input module 10 to the relay module 110. Use of a single cable 52 minimizes the number of cables strewn across the floor of the work area and simplifies set-up of the equipment. In a typical embodiment, each communications data transmission cable 52 is an unshielded twisted pair ("UTP") cable.

Electrical energy for operating the various items of equipment associated with the input module 10 is provided by a single power cord 54, sized and dimensioned to conveniently be received into an electrical power outlet located within the work area.

In operation for work within a radiation hazardous work environment, the user of the input module 10 of the invention transports the input module 10 into a hazardous area where workers will be performing work. In those embodiments where the portable housing 12 is equipped with wheels 24, the input module 10 can be conveniently pulled along the floor of the work area.

Once in the work area, the removable doors 36 on the opposite sides 34 of the portable housing 12 are removed, any equipment stored within the housing 12 is removed from the housing 12 for set-up and the internal parts disposed within the housing 12 are made operable.

Each of the microcell base stations 14 is connected via the audio signal receiver cables 38 to the audio signal receiver cable connection ports 40 located on the exterior of the portable housing 12. In devices having a cable tester, each of the microcell base stations 14 and requisite cable connections are tested for proper set-up.

Each of the video cameras 16 is connected to the VTT transmitter 30 by connecting the video data input cables 41 to the video data input cable connection ports 42, and each of the dosimeter radiation data receivers 18 is attached to the terminal server 32 by attaching the dosimeter radiation input cables 48 to the dosimeter radiation input cable connection ports 50.

In the preferred embodiments, set-up of the three primary classes of equipment (audio, video and dosimetry) is simple, easy and virtually "full-proof" because each of the connecting cables are sized and dimensioned so that only the correct cables can be connected to their respective connection ports. The cables and/or the connection ports can also be color-coded.

Thereafter, the electrical power cord 54 associated with the input module 10 can be connected to a suitable electrical power outlet located within the work area.

Finally, the communications data transmittal cable 52 is connected between the input module 10 and the relay module 110 or other suitable location disposed separate from the input module 10.

It should be appreciated by those skilled in this technology that the input module 10 can be assembled conveniently, quickly and with minimum error. Once assembled, the input module 10 provides critical data and communications input from the work area with a minimum of cabling strewn about the work area.

When work within the work area is complete, the input module 10 and its various associated data and communications receiving devices and cables can also be conveniently and quickly disassembled and removed from the work area for storage.

Use of the input module 10 has been found to markedly reduce the costs associated with set-up, testing, operation and disassembly of data and communications receiving equipment necessary within hazardous work areas. Moreover, use of the invention 10 has been found to markedly increase the ability of the work coordinator to conduct work within a hazardous area in a safe and efficient manner.

Use of the input module 10 is also believed to be of great utility to hazardous materials, fire and other emergency response personnel who must deal with an emergency within a hazardous area. Such emergency response personnel can quickly, simply and effectively set up and operate communications and/or radiation dosimeter data transmitting equipment so that emergency personnel can safely deal with an emergency within the hazardous area.

Having thus described the invention, it should be apparent that numerous structural modifications and adaptations may be resorted to without departing from the scope and fair meaning of the instant invention as set forth hereinabove and as described hereinbelow by the claims. In this regard, any element in a claim that does not explicitly state "means" for performing a specified function, or "step" for performing a specified function should not be interpreted as a "means" or a "step" clause as specified in 35 U.S.C.§112.

What is claimed is:

1. A combination comprising:
   (a) a portable housing;
   (b) an audio signal receiver attached to the housing, the audio signal receiver being capable of receiving electromagnetic audio signals;
   (c) a video signal receiver attached to the housing, the video signal receiver being capable of receiving video signals;
   (d) a radiation dosimeter receiver attached to the housing, the radiation dosimeter receiver being capable of receiving radiation dosimeter data; and
   (e) a communications data transmitter disposed within the portable housing for transmitting said audio signals, said video signals and said radiation dosimeter data to a location separate from the housing via a single communications data transmission cable.

2. The combination of claim 1 wherein the housing encloses a volume less than about 12 cubic feet.

3. The combination of claim 1 wherein the housing has the shape of a parallelepiped.

4. The combination of claim 1 wherein the housing has a plurality of handles and wheels to allow it to be easily translate across a horizontal surface.

5. The combination of claim 1 having a plurality of audio signal receivers attached to the housing.

6. The combination of claim 1 wherein the audio signal receivers are microcell base stations, each capable of supporting multiple cellular telephones.

7. The combination of claim 1 wherein the audio signal receiver is attached to the housing via an audio signal receiver input cable which attaches to an audio signal receiver cable connection port attached to the housing.

8. The combination of claim 7 further comprising an audio signal receiver input cable tester.

9. The combination of claim 1 wherein the video signal receiver has multiple video signal receivers attached to the housing.

10. The combination of claim 1 wherein the video signal receiver further comprises a video camera control signal transmitter capable of transmitting control signals to a pan/tilt/zoom video camera.

11. The combination of claim 1 wherein the video signal receiver is attached to the housing via a video signal receiver input cable which attaches to a video signal receiver cable connection port attached to the housing.

12. The combination of claim 1 wherein the radiation dosimeter receiver is capable of receiving radiation dosimeter data via electromagnetic waves.

13. The combination of claim 1 comprising a plurality of radiation dosimeter receivers attached to the housing.

14. The combination of claim 1 wherein the radiation dosimeter receiver is powered by AC electrical power having a voltage greater than about 10 volts.

15. The combination of claim 1 wherein the radiation dosimeter signal receiver is attached to the housing via a radiation dosimeter signal receiver input cable which attaches to a radiation dosimeter signal receiver connection port attached to the housing.

16. The combination of claim 1 wherein the communications data transmitter includes a plurality of VTT transmitters and a terminal server.

17. The combination of claim 1 wherein the audio signal receiver is attached to the housing via an audio receiver cable connection port and an audio signal receiver input cable, the video receiver is attached to the housing via a video signal receiver cable connection port and the radiation dosimeter receiver is attached to the housing via a radiation dosimeter receiver cable connection port and a radiation dosimeter receiver input cable, and wherein the audio receiver cable connection port can only be used to connect the audio signal receiver input cable, wherein the video signal receiver connection port can only be used to connect the video signal receiver input cable and wherein the radiation dosimeter receiver cable connection port can only be used to connect the radiation dosimeter receiver input cable.

18. The combination of claim 1 wherein the communications data transmission cable is a UTP cable.

19. A combination comprising:
   (a) a portable housing enclosing a volume less than about 12 cubic feet;
   (b) a plurality of audio signal receivers attached to the housing, the audio signal receivers being capable of receiving audio communications data from a plurality of cellular telephones via electromagnetic waves;
   (c) a plurality of video signal receivers attached to the housing, the video signal receivers being capable of receiving electromagnetic video signals;
   (d) a plurality of radiation dosimeter receivers attached to the housing, the radiation dosimeter receivers being capable of receiving radiation dosimeter data via electromagnetic waves; and
   (e) a communications data transmitter disposed within the portable housing for transmitting said audio signals, said video signals and said dosimeter data to a location separate from the housing via a single communications data transmission cable.

20. A combination comprising:
   (a) a portable housing;
   (b) an audio signal receiver attached to the housing, the audio signal receiver being capable of receiving electromagnetic audio signals;
   (c) a video signal receiver attached to the housing, the video signal receiver being capable of receiving video signals;
   (d) a hazardous material indication receiver attached to the housing, the hazardous indication receiver being capable of receiving hazardous material indication data; and
   (e) a communications data transmitter disposed within the portable housing for transmitting said audio signals, said video signals and said radiation dosimeter data to a location separate from the housing via a single communications data transmission cable.

* * * * *